May 25, 1965     D. M. PHILLIPS     3,185,757
POLE MOUNTED TERMINAL BOX AND SECTIONAL LEAD-IN CONDUIT
Filed Sept. 5, 1961     3 Sheets-Sheet 1
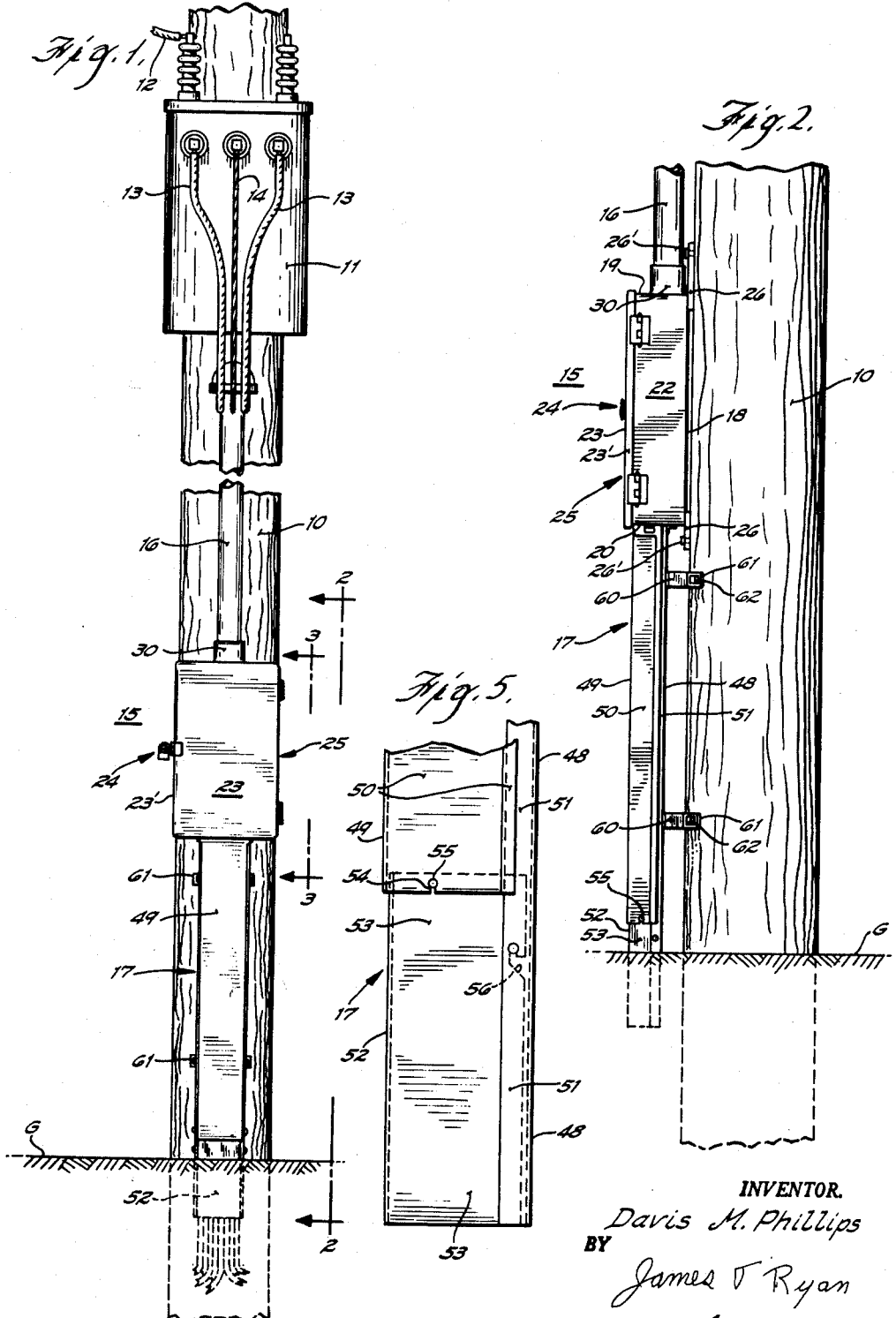
INVENTOR.
Davis M. Phillips
BY James T. Ryan
ATTORNEY.

May 25, 1965  D. M. PHILLIPS  3,185,757
POLE MOUNTED TERMINAL BOX AND SECTIONAL LEAD-IN CONDUIT
Filed Sept. 5, 1961  3 Sheets-Sheet 2

INVENTOR.
Davis M. Phillips
BY
James T Ryan
ATTORNEY.

INVENTOR.
Davis M. Phillips
BY James T Ryan
ATTORNEY.

United States Patent Office 3,185,757
Patented May 25, 1965

3,185,757
POLE MOUNTED TERMINAL BOX AND
SECTIONAL LEAD-IN CONDUIT
Davis M. Phillips, South Milwaukee, Wis., assignor to McGraw-Edison Company, Milwaukee, Wis., a corporation of Delaware
Filed Sept. 5, 1961, Ser. No. 135,981
2 Claims. (Cl. 174—38)

This invention relates generally to a terminal box assembly and more particularly to a pole mounted terminal box assembly for use with underground services.

As underground distribution systems become more popular various combinations and modifications of the system are utilized. One modification of the totally buried distribution system involves pole mounting the distribution transformer while burying the secondary service lines. Somewhere between the transformer location and the ultimate customer provision must be made to make service taps from the transformer secondary cable. The decision as to where to make these taps rests upon a number of factors including appearance, economics, accessibility, and a number of similar considerations.

In line with the foregoing I have provided a terminal box which is mounted at an accessible location on the power pole. Thusly the transformer secondary cable extends along the power pole from the transformer to the terminal box with the service feeders extending out of the terminal box, down the power pole, to a buried position and underground to the customer.

The instant structure is particularly adapted for use with the above described system and in accord with this the following objects more clearly point out the functional requirements of the device.

It is therefore an object of this invention to provide an economical, easily installed terminal box assembly for use with semi-underground distribution systems.

Another object of this invention is to provide a simple, tamperproof, easily accessible terminal box assembly.

A further object of this invention is to provide a terminal box assembly in which cable replacement is facilitated.

A still further object of this invention is to provide a mechanically strong, electrically safe terminal box assembly.

A further object is to provide an assembly in which deformation of current carrying conductors is minimized.

Another object of this invention is to provide a terminal box which may be utilized in combination with a simple easily installed cable enclosure to successfully enclose the current carrying cables between the box and ground.

Still another object of this invention is to provide a method of substantially enclosing all current carrying members between an elevated transformer and ground, wherein secondary tapping is accomplished between the transformer and ground level.

Other objects and advantages of my invention will be apparent from the following description of the preferred embodiment of the invention taken in connection with the accompanying drawings in which:

FIG. 1 is a view in elevation showing the invention as it is used with a distribution transformer;

FIG. 2 is an enlarged side view of a portion of FIG. 1 taken along the lines 2—2;

FIG. 5 is an enlarged side view of a portion of FIG. 2.

Figure 3:
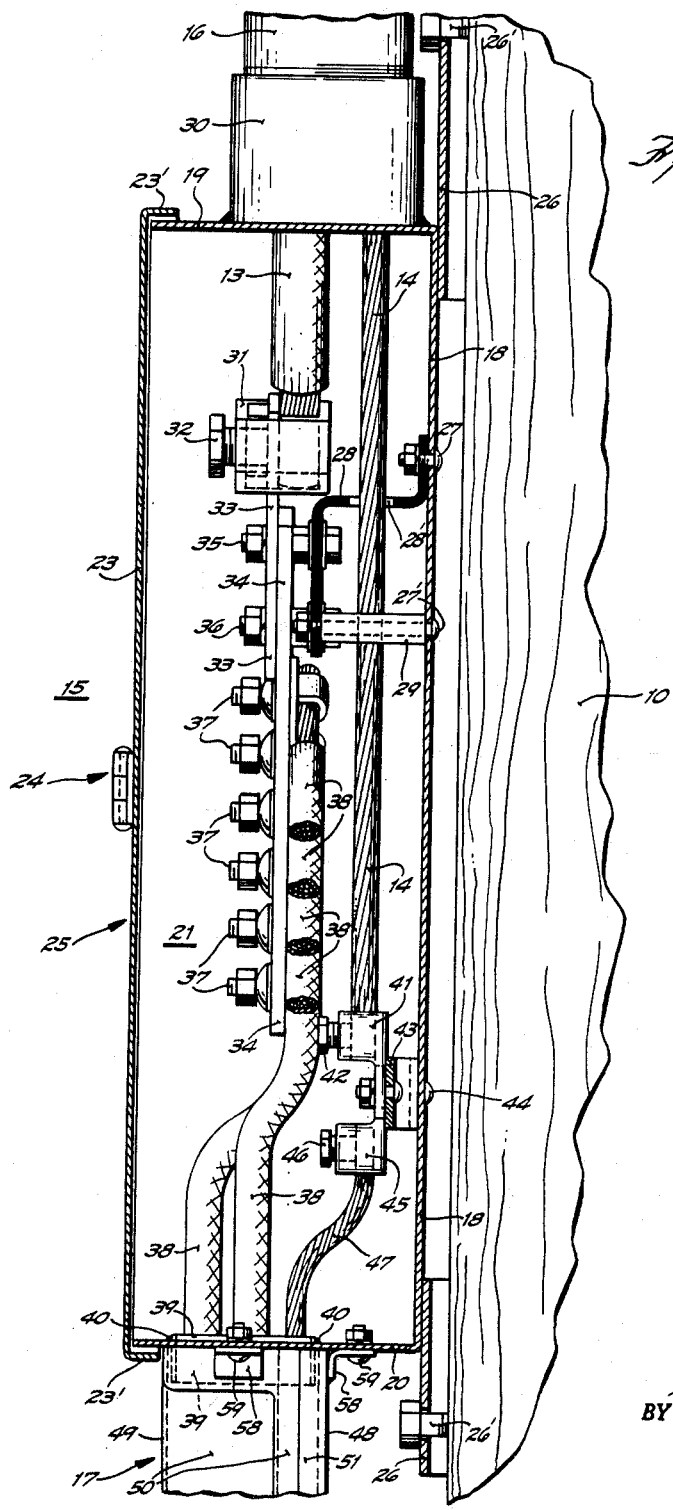
FIG. 3 is an enlarged cutaway side view of a portion of FIG. 1 taken along the lines 3—3 of FIG. 1.

Referring now to FIG. 1, 10 indicates a power pole of the well known and conventional type. A distribution transformer 11 is mounted on the upper region of the pole 10 and receives incoming leads 12. Secondary cable conductors 13 and the neutral conductor 14 emerge from the transformer 11 and extend downwardly along the periphery of the pole to a terminal box assembly which is indicated generally at 15. The secondary conductors 13 (insulated) and the neutral 14 may, as they emerge from the transformer, be grouped together and inserted in a cable guard 16 which is affixed by any common expedient to the pole. The cable guard 16 may be a circular conduit such as a pipe or any similar means which will protect the members 13 and 14.

The terminal box assembly 15 comprises a generally box-like portion 25 and a pedestal portion 17. The box-like portion includes a back portion 18, top and bottom portions 19 and 20 respectively, dependent side portions 21 and 22 and a frontal door portion 23 hingedly mounted on side portion 22. The frontal door portion 23 has a flanged portion 23' extending therearound so that when the door is in closed position the flange overlies portions of the top, bottom and sides of the box thereby preventing moisture and other contaminants from gaining access thereto. A latching or locking mechanism 24 may also be associated with the door and/or side portion 21 to prevent unauthorized entrance to the terminal box.

Adjacent the top and bottom of the back of portion 18 is a strap member 26 which is affixed thereto as for instance by welding. The member 26 has an aperture therein which is adapted to receive a lag screw 26' or similar means. The lag screws 26' engage the power pole 10 and serve to fixedly position the box 25 to the pole.

Affixed to the front of portion 18 of the box as by carrier bolt assemblies 27 is a generally Z-shaped support member 28 (FIGS. 3 and 4) which may be made of any insulating material but which is perferably constructed of Fiberglas due to that material's especially fine mechanical and electrical properties. The lowermost portion of the Z-support member 28 is affixed to portion 18 by means of bolt assembly 27' and may be separated from the back portion (FIG. 3) by a pipe spacer 29 or similar member. An aperture 28' is provided in a portion of member 28 for purposes which will be subsequently explained.

Integral with or otherwise affixed to the top of the box 25 is a hollow projection 30 which may for example be cylindrical in shape and which communicates with the interior of the box to provide an entranceway for conductors 13 and neutral 14. The conductors 13 are fed into the interior of the box thru member 30 and are received in cable terminal members 31. The members 31 are provided with adjustable engaging means 32 to fixedly attach the cable to the member.

Figure 4:
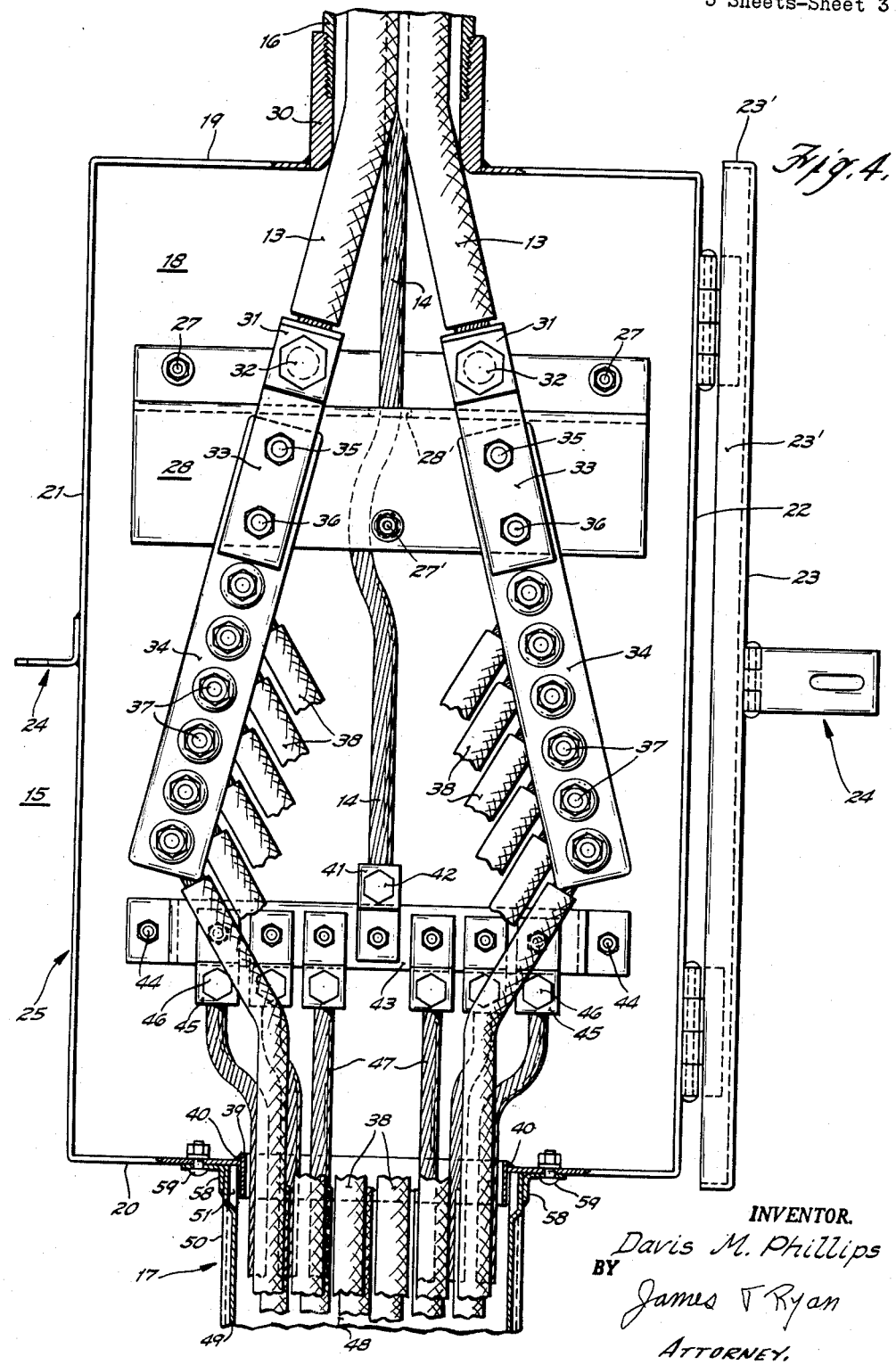
FIG. 4 is an enlarged frontal view of FIG. 2 with the door of the terminal box swung to open position.

Conductive extender members 33 are also received in termination members 31 and are biased into contact with the conductor 13 by adjustable means 32. In contact with extender members 33 and coextensive for a distance therewith, are terminal members 34 which extend for a distance beyond the end of extender members 33. Fastening assemblies 35 and 36 are utilized to affix the respective extender members 33, terminal members 34 and Z-shaped support member 28 to one another. It should especially be noted that the terminal members diverge with respect to one another (FIG. 4).

Positioned along the surface of each of the terminal members 34 is a series of service jacks 37, six of these being indicated in this embodiment although of course any lesser or greater number could be utilized and should be considered within the purview of this invention. Each of the service jacks 37 mechanically and electrically connects a customer service line 38 to the terminal member 34. The twelve customer service conductors extend from the jacks 37 and are brought into a bundled relation near the bottom of the box. The bundled conductors exit from the box thru a member 39 which is affixed as by a weld 40 to the box and which communicates with the interior of the pedestal member 17.

The transformer neutral 14 like the conductors 13 is brought into the box thru the entrance fitting 30. It is then passed thru aperture 28' in member 28 and terminates in a neutral terminal member 41 which is provided with adjustable fastening means 42. The member 41 is mechanically and electrically connected to a neutral conductor bar 43 which may be of any conducting material but which is preferentially of copper. The transversely extending terminal bar member 43 is affixed to the back of the box and horizontal spaced rearwardly of the terminal members 33 and 34 by means of fastening means 44. Situated along the length of bar 43 are a plurality (six in this case) of customer neutral jacks 45 each of which is provided with an adjustable fastening member 46. The customer neutrals 47 are tightly affixed to members 45 by means of the adjustable fasteners 46 and extend downwardly therefrom. The customer service lines 38 and customer neutrals 47 are grouped together near the bottom portion of the box 25 and are fed thru the member 39 and thereby emerge from the confines of the box 25.

Positioned immediately beneath the box 25 and preferably directly below the member 39 is the pedestal portion or cable protector portion 17 which extends along the power pole 10 and which terminates at a point just below ground level G. While the pedestal portion 17 may conceivably take a variety of forms the structure heretofore described finds its greatest utility in conjuction with a particular form of pedestal. This much preferred form of pedestal includes a relatively shallow channel-shaped member 48 and a relatively deep channel shaped member 49. The side walls or flanges 50 of member 49 overlap the flanges 51 of the shallow member 48. Immediately below the member 49 is another box-like member 52 having sides 53 which are received within the flanges 51 of the member 48. The upper portions of the sides 53 are also received within the lower portions of the flanges 50. A slot 54 is present along the lower flange edge of member 49 and is adapted to receive a shoulder rivet 55 which is positioned adjacent the upper end of the flanges 53. Similarly a keyhole slot 56 in the flange 53 and a shoulder rivet in the flange 51 are adapted to coordinate with one another.

The upper portions o the pedestal 17 are fixedly attached to the bottom 20 of the box by means of welded straps 58 and fastening means 59. In order to separate the respective portions of the pedestal 17 the fastening means 59 must be detached prior to removing the rivets from their slots. Thusly a compact, tamperproof assembly is accomplished.

Welded to the back of the pedestal (the web of channel 48) are spaced apart strap members 60 having side portions 61 which are adapted to engage the periphery of the pole 10. Fastening means such as screws 62 extend thru portions 61 and engage the pole 10 thereby firmly attaching the pedestal to the pole.

The device heretofore descrbed achieves its greatest utility when the secondary and customer leads have been already properly positioned. To put the device in service all that need be done is to bring the customer leads up thru the pedestal into the box and to bring the secondary down into the box, affix the assembly to the pole, and make the electrical connections within the box.

However, in some cases it may prove advantageous to field assemble the box and pedestal. Either the box or pedestal would in this case be first affixed to the pole and then the unaffixed component would be affixed to the already fixed component and then attached to the pole.

There are many advantages to be obtained thru the use of this structure, the most important being its pleasing aesthetic nature, its inexpensive cost, the ease with which it may be initially installed and subsequently if the need arises, partially dismantled and the fact that due to its generally overlapping construction it will effectively protect the conductors from abrasion and other mechanical damage as well as from conditions which would be disadvantageous from an electrical sense.

Another particularly important feature of the device is that conductor and cable bending is kept to a minimum due to the terminal design and its positioning in the box and due to the pedestal design which results in a straight protective passageway free from internal protuberances.

While a particular embodiment of the invention has been shown and described, it will be obvious to those skilled in the art that various changes and modifications can be made therefrom without departing from the invention and, therefore, it is intended for the appended claims to cover all such changes and modifications as fall within the true spirit and scope of the invention.

I therefore claim:

1. The combination of an elongate cable enclosure member and an elevated terminal box adapted to be mounted on a distribution transformer bearing pole between the transformer and ground, said terminal box comprising a housing having top and bottom walls and a movable closure portion; cable entrance means communicating with said box through said top wall; cable exit means interconnecting said cable enclosure member and said box through said bottom wall; and a pair of terminal means fixedly positioned within said housing in horizontally spaced downwardly diverging relation, each of said terminal means presenting a plurality of conductor connecting portions along the diverging portions thereof accessible from between said diverging portions, the axis of said exit means lying in a plane intermediate the divergent ends of said terminal means, whereby conductors extending into said box through said enclosure member may approach and be connected to said terminal means without excessive bending and said cable enclosure comprising a relatively shallow first channel member extending from below the ground line to said box; a relatively deep second channel member with the flanges thereof extending toward and overlapping the flanges of said first channel, said second channel member extending below the ground line and a third channel member extending from said second channel member to said box with flange portions of said third channel member overlapping and releasably secured to the flanges of said first channel member, said channel members forming a continuous enclosure from said ground line to said box.

2. The combination of an elongate cable enclosing member and an elevated terminal box, adapted to be mounted on a distribution transformer bearing pole between the transformer and ground, said terminal box comprising a housing having top and bottom walls; cable entrance means through said top wall; cable exit means through said bottom wall coaxial with said entrance means and interconnecting said elongate member and said terminal box; an insulating support mounted within said box; first and second horizontally spaced, downwardly diverging terminal members mounted on said support; conducting securing means presented by the upper ends of said first and second terminal members in confronting relation to said entrance means; a plurality of service jacks presented by said first and second terminal members along the lower diverging portions thereof each of said service jacks presenting conductor connecting portions with the axis thereof inclined downwardly toward the space between the divergent ends of said terminal members accessible from intermediate said first and second terminal members, whereby conductors extending into said box from said elongate member may be secured to said first and second terminal members without excessive bending and a third terminal member extending transversely of said box and horizontally spaced from said first and second terminal members and an aperture in said insulating support for receiving and positioning a conductor extending therethrough from said entrance means to said third terminal member.

References Cited by the Examiner

UNITED STATES PATENTS

| | | | |
|---|---|---|---|
| 1,243,902 | 10/17 | Van Ranst | 174—60 |
| 2,023,433 | 8/33 | McConnell | 174—50 |
| 2,261,857 | 11/41 | Novak et al. | 174—101 X |
| 2,297,833 | 10/42 | Johanson | 339—198 |
| 2,452,494 | 10/47 | Rothen | 174—59 |
| 2,916,539 | 1/58 | Hamilton | 174—38 |
| 3,035,242 | 5/62 | Sloop | 339—141 X |

FOREIGN PATENTS 1,151,086  1/58  France.

JOHN F. BURNS, *Primary Examiner.*

JOHN P. WILDMAN, DARELL L. CLAY,
*Examiners.*